US011312809B2

(12) United States Patent
Meng et al.

(10) Patent No.: US 11,312,809 B2
(45) Date of Patent: Apr. 26, 2022

(54) FLEXIBLE POLYURETHANE FOAM HAVING PROLONGED RECOVERY TIME

(71) Applicant: Dow Global Technologies LLC, Midland, MI (US)

(72) Inventors: Qinghao Meng, Angleton, TX (US); Meagan Broadway, Freeport, TX (US); Kaoru Aou, Lake Jackson, TX (US); William J. Harris, Lake Jackson, TX (US); Felipe A. Donate, Midland, MI (US); Daniel L. Dermody, Midland, MI (US); Christopher Thiede, Lake Jackson, TX (US); Van M. Delk, Jr., Freeport, TX (US); Helge Braun, Lake Jackson, TX (US); Yin Tang, Pearland, TX (US); Adam L. Grzesiak, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 5 days.

(21) Appl. No.: 16/979,313

(22) PCT Filed: Mar. 8, 2019

(86) PCT No.: PCT/US2019/021430
§ 371 (c)(1),
(2) Date: Sep. 9, 2020

(87) PCT Pub. No.: WO2019/177903
PCT Pub. Date: Sep. 19, 2019

(65) Prior Publication Data
US 2021/0061941 A1  Mar. 4, 2021

Related U.S. Application Data

(60) Provisional application No. 62/642,355, filed on Mar. 13, 2018.

(51) Int. Cl.
C08G 18/16     (2006.01)
C08G 18/18     (2006.01)
C08G 18/20     (2006.01)
C08G 18/24     (2006.01)
C08G 18/28     (2006.01)
C08G 18/48     (2006.01)
C08G 18/64     (2006.01)
C08G 18/76     (2006.01)
C08J 9/12      (2006.01)
C08K 3/04      (2006.01)
C08K 3/36      (2006.01)
C08K 9/06      (2006.01)
C08L 83/04     (2006.01)
C08L 93/04     (2006.01)

(52) U.S. Cl.
CPC ....... $C08G$ $18/165$ (2013.01); $C08G$ $18/1833$ (2013.01); $C08G$ $18/2027$ (2013.01); $C08G$ $18/244$ (2013.01); $C08G$ $18/283$ (2013.01); $C08G$ $18/485$ (2013.01); $C08G$ $18/6492$ (2013.01); $C08G$ $18/7621$ (2013.01); $C08J$ $9/125$ (2013.01); $C08K$ $3/04$ (2013.01); $C08K$ $3/36$ (2013.01); $C08K$ $9/06$ (2013.01); $C08L$ $83/04$ (2013.01); $C08L$ $93/04$ (2013.01); $C08G$ $2110/005$ (2021.01); $C08G$ $2110/0008$ (2021.01); $C08G$ $2110/0083$ (2021.01); $C08J$ $2203/10$ (2013.01); $C08J$ $2205/06$ (2013.01); $C08J$ $2375/08$ (2013.01); $C08K$ $2201/006$ (2013.01)

(58) Field of Classification Search
CPC .............. C08G 18/165; C08G 18/1833; C08G 18/2027; C08G 18/244; C08G 18/283; C08G 18/485; C08G 18/6492; C08G 18/7621; C08G 2110/0008; C08G 2110/005; C08G 2110/0083; C08J 9/125; C08J 2203/10; C08J 2205/06; C08J 2375/08; C08K 3/04; C08K 3/36; C08K 9/06; C08K 2201/006; C08L 83/04; C08L 93/04
See application file for complete search history.

(56) References Cited

U.S. PATENT DOCUMENTS

| 4,595,610 A | 6/1986 | Fey | |
|---|---|---|---|
| 4,725,627 A | 2/1988 | Aranson | |
| 2010/0216905 A1* | 8/2010 | Kuwamura | C09D 175/14 521/170 |
| 2013/0131231 A1* | 5/2013 | Bouguettaya | C09J 131/04 524/72 |
| 2013/0216814 A1* | 8/2013 | Hirao | C08F 2/32 428/221 |
| 2013/0224467 A1* | 8/2013 | Hirao | B32B 5/022 428/221 |

FOREIGN PATENT DOCUMENTS

| WO | 98/52986 A | 11/1998 |
|---|---|---|
| WO | 2017/210439 A | 12/2017 |

* cited by examiner

Primary Examiner — John M Cooney

(57) ABSTRACT

Recovery times and/or airflow of flexible polyurethane foam is increased by including certain tackifiers in the foam formulation. The tackifiers are characterized in being incompatible with polyol or polyol mixture used to make the foam, having a viscosity of at least 5,000 centipoise at 25 #C and having a glass transition temperature of at most 20 #C. The tackifier is pre-blended with certain monols to form a lower-viscosity blend that is combined with one or more other polyols and a polyisocyanate to form a reaction mixture for producing a polyurethane foam.

17 Claims, No Drawings

FLEXIBLE POLYURETHANE FOAM HAVING PROLONGED RECOVERY TIME

This invention relates to flexible polyurethane foam characterized in having a prolonged recovery time, and to methods for making such a foam.

Slow-recovering flexible polyurethane foam represents a fast-growing segment of the polyurethane foam industry. Their low resiliency and slow recovery from compression distinguish these foams from HR (high resiliency) and "conventional" flexible polyurethane foams, which have much greater resiliency and which recover almost immediately after compression. These slow-recovering foams are sometimes marketed as "memory" foam. They are being used increasingly in pillows and mattresses, where the viscoelastic character of the foam imparts a feel that consumers perceive as highly comfortable. They are also used in acoustic applications to reduce NVH (noise, vibration and harshness) and in various applications such as earplugs where slow recovery is advantageous.

The slow recovery of these foams is often attributable at least in part to their glass transition temperature, which often is close to the use temperature, typically in the range of about 20 to 35° C. For example, slow-recovering foam for bedding applications (mattresses, pillows) often has a glass transition temperature that ranges from about room temperature to the human torso body temperature.

These foams exhibit a large change of properties when cooled from above to below their glass transition temperature, or vice versa. Foams that have glass transition temperatures near room temperature tend to have highly variable properties depending on the ambient temperature at any given time. For example, the hardness of the foam (and therefore its perceived comfort) can change significantly with increases or decreases in ambient temperature that commonly occur with the change of seasons, the time of day or even the operation of an HVAC system within a room or building. The somewhat high glass transition temperature also creates certain disadvantages from a manufacturing perspective. Foams having a glass transition temperature of 20° C. or more often are stored at lower temperatures at which they become harder and more difficult to cut and fabricate.

At least two other approaches to increasing recovery time of polyurethane foam have been suggested. Long recovery times can be achieved even in lower $T_g$ foams if the cell windows of the foam are mostly closed. The closed cell windows inhibit the flow of air in and out of the foam as it is compressed and subsequently decompresses. This pneumatic effect prolongs the recovery time. The problem with this approach is that foams that do not breathe easily and for that reason do not dissipate moisture vapor as quickly, meaning that when such foams are used in mattresses, the body cannot regulate body skin temperature as easily, leading to discomfort.

Another suggested approach to producing foam having a long recovery foam is to apply a tacky coating to the internal surfaces of the foam. This can be done by applying the coating to the finished foam. For example, WO 2017/210439 describes applying an aqueous polymer emulsion that contains an encapsulated phase change material to a previously formed polyurethane foam. This approach requires additional manufacturing steps, including an energy- and/or time-intensive drying step to remove residual water from the applied emulsion.

A potentially simpler and less expensive way to apply the tacky coating is to incorporate the coating material into the foam formulation. This has proven to be a difficult problem because the tacky material tends to be incompatible with other components of the foam formulation, and in addition tends to be highly viscous. Each of those attributes makes foam processing difficult, especially on a large scale. U.S. Pat. No. 4,625,627, for example, describes method for making squeezable foam toys that have dimensional memory. An aqueous emulsion of a vinyl or acrylic polymer is incorporated into the foam formulation. This method is plagued with difficulties. It is limited to making small foam objects. An organic cosolvent is needed, which must be removed from the product to avoid odor and solvent exposure issues. Large amounts of water are needed in the formulation to carry in the vinyl or acrylic polymer into the foam formulation. A prepolymer process is needed because of the large amounts of water used. The prepolymer process is more expensive because of the need to separately manufacture the prepolymer.

There is a desire for an efficient and effective method to produce a flexible polyurethane foam that has a prolonged recovery time. The method should be amenable to large-scale foam production.

This invention in one aspect is a method of making a flexible polyurethane foam, comprising reacting, at an isocyanate index of 60 to 110, a reaction mixture comprising A) a polyether polyol having a hydroxyl equivalent weight of no greater than 225 or mixture of two or more such polyether polyols, wherein the polyol or mixture of polyols (i) has a number average hydroxyl functionality of 2 to 4; (ii) includes at least one polyether polyol that has a hydroxyl number of less than 170 and (iii) has an oxyethylene content of at least 10% by weight and/or includes at least one polyether polyol that contains at least 40% by weight oxyethylene units;

B) 1 to 5 parts by weight water per 100 parts by weight of component A), and

C) at least one organic polyisocyanate, in the presence of

D) at least one catalyst for the reaction of an isocyanate group with water and/or an alcohol;

E) at least one foam stabilizing surfactant;

F) 1 to 45 parts by weight of a tackifier per 100 parts by weight of component A) wherein
 (i) the tackifier has a viscosity of at least 5,000 centipoise at 25° C., and
 (ii) the tackifier has a glass transition temperature of at most 20° C.; and G) 0.05 to 10 parts by weight per 100 parts by weight of component A) of at least one monoalcohol, the monoalcohol being characterized in having at least 4 carbon atoms, a molecular weight of up to 300 g/mol and a viscosity of up to 500 cps at 25° C. as measured using a cone-and-plate viscometer, provided further that the weight proportion of components F) and G) is at least 20:80 but not greater than 95:5; and wherein components F) and G) are pre-blended prior to being combined with either of components A) and C) to form a pre-blend having a viscosity of no greater than 20,000 cps at 25° C. as measured using a cone-and-plate viscometer.

The addition of the tackifier has been found to increase recovery times of the foam while preserving high airflows, or in some embodiments to increase airflow with or without an increase in recovery time. This effect is seen even when the polyurethane foam has a somewhat low glass transition temperature, such as 16° C. or below.

The foams therefore have a very desirable set of haptic properties that make them excellent candidates for bedding and other comfort applications in which the foam becomes exposed to the body heat of and/or water vapor evaporating from the body of a human user. The foam or an article containing the foam may in such applications support at least a portion of the weight of a human user.

The ability to increase the recovery time and/or airflow of a foam having a glass transition temperature of 16° C. or below is quite significant, as the properties of such a foam tend to remain fairly constant across the normal range of use temperatures.

This invention also provides significant advantages to foam fabricators who must cut the foam for assembly into a downstream product, as the foam remains soft through ordinary seasonal and diurnal variations in warehousing temperatures and so remains easy to cut and otherwise fabricate.

It has been found that blends of components F) and G) have unexpectedly low viscosities. Another surprising and important advantage of the invention, therefore, is that by forming the pre-blend of components F) and G), one obtains a low viscosity material that is easily processed in industrial foam production equipment that cannot readily handle component F) by itself. Furthermore, the blends of components F) and G) exhibit excellent storage stability. This latter attribute permits the pre-blend of components F) and G) to be manufactured and then stored for prolonged periods of time prior to being used in the foam-forming process.

Component A) may be a single polyether polyol having a hydroxyl number of 225 or less or a mixture of two or more polyether polyols that have a hydroxyl number of 225 or less. The average hydroxyl number of Component A) may be less than 160 or less than 150. In some embodiments the average hydroxyl number of Component A) is at least 80 or at least 100. The hydroxyl number of Component A) may be measured using titration methods such as ASTM D4274-16; alternatively it can be calculated from the measured hydroxyl numbers of the individual constituents of Component A) if more than one polyol is present within Component A).

Component A) has an average nominal hydroxyl functionality of 2 to 4. The average nominal hydroxyl functionality of component A) may be 2 to 3.5 or 2 to 3.0. The nominal functionality of a polyether polyol is equal to the number average of oxyalkylatable groups on the initiator(s) used to make the polyether alcohol. As is well known, the actual functionality of polyethers tends to be somewhat lower than the nominal functionality. The number of hydroxyl groups per molecule can be determined by dividing the number average molecular weight by the hydroxyl equivalent weight.

Individual polyether polyols that constitute Component A) may have functionalities greater than 4, provided that the average nominal functionality of Component A) is within the aforementioned ranges.

Component A) has an oxyethylene content of at least 10% by weight (based on the total weight of the Component A)), and/or includes at least one polyether polyol having an oxyethylene content of at least 40% by weight (based on the weight of such polyether polyol). In some embodiments the oxyethylene content of Component A) may be as much as 75% by weight, at much as 50% by weight, as much as 30% by weight or as much as 20% by weight, based on the total weight of Component A).

Component A) may contain at least one polyether polyol (A-1) that has a hydroxyl number of 110 to 225 (corresponding to a hydroxyl equivalent weight of about 510 to about 250), especially from 140 to 205 (hydroxyl equivalent weight of about 400 to 275) and contains less than 50% by weight oxyethylene units. This polyether polyol (A-1) may have, for example, a nominal functionality of 2 to 4. This polyether polyol (A-1) may be a homopolymer of propylene oxide or a random and/or block copolymer of propylene oxide and ethylene oxide. Its oxyethylene content, in the case of a copolymer, may be, for example, at least 5%, at least 10% or at least 15% and may be as high as high as 49%, as high as 35% or as high as 25%, by weight.

Component A) may contain at least one polyether polyol (A-2) that has a hydroxyl number of less than 110, such as 28 to 100, 30 to 75 or 30 to 60, and contains less than 50% by weight oxyethylene units. This polyether polyol (A-2) may have, for example, a nominal functionality of 2 to 4. This polyether polyol (A-2) may be a homopolymer of propylene oxide or a random and/or block copolymer of propylene oxide and ethylene oxide. Its oxyethylene content, in the case of a copolymer, may be, for example, at least 5%, at least 10% or at least 15% and may be as high as 49%, as high as 35% or as high as 25%, by weight.

Component A) may contain at least one polyether polyol (A-3) that has a hydroxyl number of 20 to 225 and an oxyethylene content of greater than 50% by weight. Its oxyethylene content may be, for example, at least 75%, or at least 80% by weight and may be as high as 100% or as high as 90% by weight. This polyether polyol (A-3) may have, for example, a nominal functionality of 2 to 4. This polyether polyol may be a homopolymer of ethylene oxide or a random and/or block copolymer of propylene oxide and ethylene oxide. At least 50% or at least 75% of the hydroxyl groups of polyether polyol (A-3) may be primary hydroxyls.

Component A) (or any constituent thereof), may contain dispersed polymer particles. These dispersed polymer particles are counted toward the weight of Component A). The dispersed polymer particles may be, for example, polyurea, polyurethane, and/or polyhydrazide, or a polymer of one or more vinyl monomers. Useful vinyl monomers include, for example, a polyolefin (such as polymers and copolymers of ethylene), a polyester, a polyamide, a polycarbonate, a polymers or copolymer of an acrylic and/or methacrylic ester, a homopolymer or copolymer of styrene, a homopolymer or copolymer of acrylonitrile and the like. In some embodiments, the dispersed particles are styrene-acrylonitrile copolymer particles.

In some embodiments Component A) includes a mixture of any two or more of polyether polyols A-1), A-2) and A-3).

The dispersed polymer particles in some embodiments have particle sizes from 100 nm to 25 µm, more typically from 250 nm to 10 µm. Preferably, at least 90 volume-% of the dispersed polymer particles have sizes within these ranges. The particle sizes are taken as diameters of spheres having an equivalent volume. Particle size measurements can be obtained by laser diffraction methods, using equipment such as a Beckman-Coulter LX 13320 laser diffraction particle size analyzer.

The dispersed polymer particles may constitute, for example, at least 1%, at least 2% or at least 3% of the total weight of Component A) and may constitute, for example, up to 60%, up to 50%, up to 40%, up to 30%, up to 20% or up to 10% of the total weight thereof.

The dispersed polymer particles may be provided in the form of a dispersion of the particles in at least one polyol that is included in Component A). At least a portion of the dispersed polymer particles preferably are grafted onto at least a portion of the base polyol molecules that form a continuous phase of such a dispersion. Such a dispersion can be manufactured by polymerizing the polymer particles in situ within a polyol, and/or by preforming the polymer and dispersing the previously-formed polymer into a polyol.

Methods for forming dispersions of polymer particles in polyols are described, for example, in WO 2012/154831, U.S. Pat. No. 4,305,857, WO 94/20558, WO 2012/154820, U.S. Pat. Nos. 4,513,124, 4,588,830, 4,640,935, 5,854,386, 6,613,827 and WO 2009/155427.

The amount of water (B) may be 1 to 4.5 or 1.75 to 3.5 parts by weight per 100 parts by weight of Component A). This amount includes water from all sources, including that carried in with other components of the reaction mixture.

The organic polyisocyanate compound (C) may have an isocyanate equivalent weight of up to 300, for example. The isocyanate equivalent weight may be up to 250 or up to 175, and in some embodiments is 50 to 175. If a mixture of organic polyisocyanates is used, these equivalent weights apply with respect to the mixture; individual organic polyisocyanates in such a mixture may have isocyanate equivalent weights above, within or below those ranges.

Examples of useful organic polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used, in particular a polymeric MDI that contains at most 70% by weight MDI, especially 50 to 70% by weight MDI. Toluene-2,4-diisocyanate, toluene-2,6-diisocyanate and mixtures thereof are generically referred to as TDI, and all can be used. Polymeric MDI is particularly preferred.

The foam is formed at an isocyanate index of 60 to 110. "Isocyanate index" is a measure of the amount of organic isocyanate provided to the reaction, being equal to 100 times the ratio of the number of equivalents of isocyanate groups to the number of equivalents of isocyanate-reactive groups provided to the reaction mixture. A mole of water is considered as having two equivalents of isocyanate-reactive groups for purposes of this calculation. The isocyanate index may be at least 70, at least 85 or at least 90 and may be up to 105, up to 100, up to 95 or up to 90.

The catalyst(s) (D) catalyze either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts.

Examples of tertiary amine catalysts include: trimethylamine, triethylamine, N-methylmorpholine, N-ethylmorpholine, N, N-dimethylbenzylamine, N, N-dimethylethanolamine, N, N, N',N'-tetramethyl-1,4-butanediamine, N, N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst such as DMEA (dimethylethanolamine), DMAPA (dimethylaminopropyl amine) or an amine-initiated polyol may be used.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl, and n is 0 to 4, and the like. The carboxylate groups of a tin carboxylate may have 6 to 18 carbon atoms. Zinc and tin catalysts may be used in conjunction with one or more tertiary amine catalysts, if used at all.

Catalysts are typically used in small amounts, each catalyst being employed for example, in an amount of from about 0.0015 to about 5 parts by weight per 100 parts weight of Component A). Zinc and tin catalysts are generally used in very small amounts within this range, such as from 0.0015 to 0.25 part per 100 parts by weight of Component A).

The foam-stabilizing surfactant (E) helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention. Examples of such silicone surfactants are commercially available under the trade names Tegostab™ (Evonik Industries AG), Niax™ (Momentive Performance Materials) and Dabco™ (Air Products and Chemicals).

From 0.01 to 5 parts by weight of surfactant per 100 parts by weight of Component A can be used. A preferred amount is at least 0.5 parts by weight per 100 parts by weight of component A), and a preferred upper amount is up to 2.5 parts per 100 parts by weight of component A.

Component (F) is a tackifier; which
(i) has a viscosity of at least 5,000 centipoise, preferably at least 10,000 cps or at least 25,000 cps, at 25° C., and
(ii) has a glass transition temperature of at most 20° C., preferably at most 0° C. or at most −10° C.

The tackifier preferably a boiling temperature in excess of 100° C. at one atmosphere pressure.

If a room temperature solid, the tackifier also preferably has a cup and ball softening temperature of at most 35° C. The tackifier also preferably is incompatible or at least partially incompatible with component A). In some embodiments the tackifier is not reactive towards water, alcohols, amino groups or isocyanates under the conditions of the foam-forming reaction.

Compatibility with component A) is evaluated by mixing the tackifier with the polyol or mixture of polyols for 30 seconds using a high-speed laboratory mixer at 1,000 rpm (revolutions per minute), at the relative proportions to be used in making foam, and then allowing the mixture to come to rest. The mixer has a pitch blade turbine impeller with a diameter of 80 mm. The cup diameter is 100 mm, its capacity is 1000 mL and the total amount of material (polyol or mixture plus tackifier) in the container is 300 grams. The formation of a visually homogeneous mixture indicates the tackifier is compatible with component A). Conversely, the formation of a heterogeneous mixture in which the tackifier forms a separate phase (which may be a disperse phase such as droplets or particles, or even a separate layer due to gross phase segregation) indicates that the tackifier is at least partially incompatible with component A). A cloudy mixture containing dispersed droplets or particles visible via microscopy also evidences at least partial incompatibility with the polyol or mixture of polyols.

The viscosity of the tackifier is measured at 25° C. using a rheometer such as a Brookfield (Brookfield Engineering Laboratories, Inc.) or AR 2000 (TA Instruments).

The glass transition temperature of the tackifier is as measured by dynamic mechanical analysis, and is taken as the temperature of the peak tan delta value.

The tackifier may be, for example, a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butene (including isobutylene) (such as H-50, H-100, H-300, H-1200 and H-1500 polybutenes from INEOS), an epoxy resin, a styrene/conjugated diene copolymer such as styrene/butadiene copolymer, an ethylene-acrylic acid copolymer, an ethylene-higher alpha olefin copolymer (including ethylene-propylene and ethylene-octene copolymers) having a density of less than 0.900 g/cc, a silicone oil, a cellulosic such as xanthan gum, ethyl cellulose, hydroxylpropyl methyl cellulose and carboxylmethyl cellulose, cationic polyacrylamide, para-t-octyl phenol formaldehyde resin, polyesters having molecular weights of 400 to 2000 including, for example, those described in WO2001060939A1, a urethane acrylate oligomers, a room temperature liquid ethylene-propylene-diene resins such as Trilene® 65 and Trilene® 67 elastomers from Lion Elastomers, and the like.

"Rosin" refers to the resinous constituent of oleoresin exuded by various plant species, mainly conifers such as pine, after removal of essential oils. "Rosin" includes, for example, wood rosin, gum rosin and tall oil rosin. The main components of rosin are 20-carbon, tricyclic, aliphatic carboxylic acids that have two or more carbon-carbon double bonds, including one or more of abietic acid, neoabietic acid, palustric acid, levopimaric acid, dihydroabietic acid, pimaric acid, isopimaric acid and sandaracopimaric acids.

A hydrogenated rosin is a rosin as just described in which one or more of the carbon-carbon double bonds of at least some of the constituent carboxylic acids have been hydrogenated.

An esterified rosin is a rosin as described above in which some or all of the carboxylic acid groups of the constituent carboxylic acids have been converted to ester groups, typically by reaction with an alcohol compound that has one or more alcohol groups. The esterified rosin preferably is not reactive with any of components A), B) and C). The alcohol used to esterify the rosin may be, for example, an alkanol ester such as a methyl, ethyl, isopropyl, n-propyl, n-butyl, isobutyl or t-butyl ester. The esterified rosin may be a polyester ester may be formed by reacting some or all of the carboxylic acid groups with a polyol having up to 6 carbon atoms such as glycerin, ethylene glycol, diethylene glycol, triethylene glycol, propylene glycol, 1,4-butane diol, 1,6-hexane diol, trimethylolpropane, trimethyolethane and the like.

A polyterpene may be a polymer of one or more of α-pinene, β-pinene and d-limonene.

C5 aliphatic resins are produced by polymerizing C5 piperylene. "C5 piperylene" refers to a mixed stream of unsaturated aliphatic 5-carbon atom compounds obtained from a nathpha cracker. C5 piperylene typically contains one or more of cis/trans 1,3-pentadienes, 2-methyl-2-butene, cyclopentene, cyclopentadiene, and dicyclopentadiene.

C9 aromatic resins are produced by polymerizing C9 aromatic hydrocarbons. "C9 aromatic hydrocarbons" refers to a mixed stream of aromatic compounds that have aliphatic carbon-carbon double bonds and 8-10 carbon atoms, such as indene, methylindenes, styrene, alpha-methyl styrene and vinyl toluenes, that are obtained from a naphtha cracker. The C9 aromatic hydrocarbons may contain a proportion of other aliphatic C9 compounds not mentioned above.

C5/C9 copolymer resins are copolymers of C5 piperylene and C9 aromatic hydrocarbons.

Examples of polyester tackifiers include diethylene glycol/phthalic anhydride polyesters having molecular weights of 400 to 2000 and hexamethylene glycol/phthalic anhydride polyesters having molecular weights of 400 to 2000. The polyester tackifiers may have viscosities in excess of 5000 cps at 140° C. Examples of such polyester tackifiers include those sold by Stepan Chemical Company as Stepanpo® PD56 and Stepanpo® PH 56.

Materials such as mineral oil can be present in the tackifier to decrease its softening temperature into the aforementioned range. In addition, the tackifier may be provided in the form of a blend with an organic polymer having a ring and ball softening temperature of greater than 50° C. Such a blend may contain 2 to 99% of the tackifier.

The amount of tackifier is 1 to 45 parts by weight per 100 parts by weight of component A). The amount of tackifier may be at least 2.5 parts, at least 5 parts, at least 7.5 parts or at least 10 parts by weight per 100 parts by weight of component A. It may be up to 30 parts, up to 25 parts, up to 20 parts or up to 15 parts by weight per 100 parts by weight of component A.

Component G) is at least one monoalcohol (monol), the monoalcohol being characterized in having at least 4 carbon atoms, a molecular weight of up to 300 g/mol and a viscosity of up to 500 cps at 25° C. as measured using a cone-and-plate viscometer. The monoalcohol preferably contains at least 5 carbon atoms and has a molecular weight of up to 275, up to 250 or up to 200.

In some embodiments, the monoalcohol has a Hansen Dispersion Parameter of 13.9 to 17.4 $(J/cc)^{1/2}$, a Hansen Polar Parameter of 1.7 to 9.2 $(J/cc)^{1/2}$, a Hansen Hydrogen Bonding Parameter of 3.8-13.9 $(J/cc)^{1/2}$. Hansen parameters can be calculated using HSPiP 5.1.03 software, available from www.hansen-solubility.com/downloads.

The monoalcohol may further have a boiling temperature of at least 100° C. at 1 standard atmosphere pressure, preferably at least 125° C. or at least 150° C.; and/or a vapor pressure at 20° C. of no more than 3 kPa, preferably no more than 0.25 kPa.

In some embodiments, the monoalcohol includes at least one hydrocarbyl group of at least 4 carbon atoms. The hydrocarbyl group may be linear or branched alkyl, alkenyl, alkynyl, cycloalkyl, alkyl-substituted cycloalkyl, aryl, alkyl-substituted aryl, and the like. In certain embodiments, the monoalcohol lacks aromatic groups and aliphatic unsaturation.

In some embodiments, component G) is or includes an alkanol such as 1-pentanol, 2-pentanol, 3-pentanol, 1-hexanol, 2-hexanol, 2-ethyl-1-butanol, 1-heptanol, 2-heptanol, 1-octanol and 2-ethyl-1-hexanol, or an alicyclic alcohol such as cyclohexanol. In other embodiments, component G) is or includes a glycol ether such as propylene glycol mono-n-butyl ether, dipropylene glycol mono-n-butyl ether, tripropylene glycol mono-n-butyl ether, 2,6-dimethyl-4-heptanol, ethylene glycol mono-n-butyl ether, diethylene glycol mono-n-butyl ether, triethylene glycol n-butyl ether, ethylene glycol mono-n-hexyl ether, diethylene glycol mono-n-hexyl ether, triethylene glycol mono-n-hexyl ether, ethylene glycol monophenyl ether, diethylene glycol monophenyl ether, triethylene glycol monophenyl ether, propylene glycol monophenyl ether, dipropylene glycol monophenyl ether and tripropylene glycol monophenyl ether. The aliphatic glycol ethers are preferred among these.

The amount of Component G) is selected in conjunction with the amount of Component F), such that the weight ratio of Component F) to Component G) is at least 20:80 but not greater than 95:5. Thus, Component G) may be present in an amount as little as 0.05 part by weight per 100 parts by weight of Component A). The ratio of Component F) to Component G) preferably is at least 50:50 or at least 60:40 and is preferably no greater than 93:7, provided that the amount of Component G) is not greater than 10 parts by weight per 100 parts by weight of Component A).

A preferred amount of Component G) is at least 0.5 part or at least one part by weight, up to 7.5 parts, up to 6 parts or up to 5 parts by weight, in each case per 100 parts by weight of Component A).

Components F) and G) are formed into a pre-blend prior to being combined with either of components A) and C), to form a pre-blend having a viscosity of no greater than 20,000 cps at 25° C. as measured using a cone-and-plate viscometer. The pre-blend preferably has a viscosity of no more than 10,000 cps, no more than 8,000 cps or no more than 5,000 cps at 25° C., but no more than 50% (preferably no more than 20% or no more than 10%) of the viscosity of Component F) by itself.

The pre-blend is conveniently prepared by heating Component F) to above its softening temperature (if a room-temperature solid) and preferably to a temperature of 40-100° C. to reduce its viscosity and render it easier to mix with Component G). Components F) and G) are then combined and mixed to form the pre-blend. The pre-blend may further include any other ingredient of the foam formulation except the polyisocyanate(s) and Component A). In particular, some or all of optional component H) as described below may be included in the pre-blend.

Optional component H) is one or more low equivalent weight polyols that have hydroxyl numbers greater than 225, such as from 225 to 1870, or 500 to 1700. Such a polyol may have 2 to 6 hydroxyl groups per molecule. Among such polyols are ethylene glycol, diethylene glycol, triethylene glycol, propylene glycol, dipropylene glycol, tripropylene glycol, 1,3-propanediol, 1,4-butanediol, 1,5-pentandiol, 1,6-hexanediol, 2-methyl-1,3-propane diol, glycerin, trimethylolpropane, triethylolpropane, pentaerythritol, erythritol, triethanolamine, diethanolamine, mannitol, sucrose, sorbitol and the like, as well as alkoxylates of any of the foregoing. If used, these polyols may be present, for example, in an amount of at least 0.1 part, or at least 0.25 part by weight per 100 parts by weight of Component A) and no more than 5 parts, no more than 2.5 parts, no more than 1 part or no more than 0.5 part by weight per 100 parts by weight of Component A).

The reaction mixture contain one or more polyether monols having a molecular weight of greater than 300. The polyether monol may be a polyether, such as a homopolymer of propylene oxide, a homopolymer of ethylene oxide, or a random and/or block copolymer of propylene oxide and ethylene oxide. The polyether monol preferably does not contain any hydrocarbyl group having more than 3 carbon atoms.

It may be desirable to include an auxiliary blowing agent in the foam formulation. Such auxiliary blowing agents include physical (endothermic) blowing agents such as various low-boiling chlorofluorocarbons, fluorocarbons, hydrocarbons and the like, as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the foam formulation may contain various other optional ingredients such as cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers; paraffin oil; plant or animal oils or fats; epoxidized vegetable oils and/or animal fats; wax particles; gel particles and the like.

Suitable flame retardants may be solid or liquid. They include, for example, one or more non-halogenated flame retardants and/or one or more halogenated flame retardants. Exemplary flame retardants include melamine or various melamine derivatives, phosphorous compounds that may or may not contain halogens, aluminum-containing compounds that may or may not contain halogens, various nitrogen-containing compounds that may or may not contain halogens, chlorinated compounds, various brominated compounds, expandable graphite, various boron compounds, and polyureas. In some embodiments, the flame retardant is melamine or a melamine derivative and/or one or more halogenated phosphorous compounds.

Flexible foam is made by combining the pre-blend of components F) and G) with Component A) and Component C), as well as any remaining ingredients not present in the pre-blend, to form a reaction mixture that reacts and cures to form the foam. Ingredients (other than the polyisocyanates) that are not present in the pre-blend can be added to the pre-blend individually or formed into various subcombinations before being mixed with the pre-blend. Alternatively, any or all of these can be fed into the reaction mixture at the same time as the pre-blend and polyisocyanate are combined by, for example, feeding one or more of them into the reaction mixture as a separate stream.

The reaction mixture is preferably formed by combining the pre-blend with the other ingredients using a mixhead or other apparatus that creates an intimate mixture of these components.

The reaction mixture is then foamed and cured. The process of this invention requires no special foaming conditions; therefore, foaming conditions and equipment described in the art for making flexible polyurethane foam are entirely suitable. In general, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam. Component G), being isocyanate-reactive, will at least partially react with polyisocyanate groups to become incorporated into the polyurethane polymer that forms as the reaction mixture cures.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures. The invention is of particular benefit in a continuous free-rise process, in which the reaction mixture is continuously dispensed into a trough or other reaction zone where it rises and expands. It has been found in such cases that the reaction mixture tends to process easily.

According to an exemplary embodiment, the foam product may be produced under vacuum using variable pressure foaming (VPF) methods.

The flexible polyurethane foam is characterized in some embodiments as having a foam density of 24 to 150 kg/m$^3$, preferably 24 to 100 kg/m$^3$ and more preferably 24 to 95 kg/m$^3$, as measured by ISO 3886.

The flexible polyurethane foam preferably has a resiliency of less than 50%, less than 30%, less than 20%, less than 12% or less than 8%, as measured according to ASTM D-3574.

The flexible polyurethane foam preferably exhibits an indentation force deflection (IFD) (25% deflection) of 5 to 80 newtons, especially 5 to 50 newtons, as measured according to ASTM D-3574.

The flexible polyurethane foam may have a glass transition temperature of, for example, −55 to 35° C. In some embodiments, the glass transition temperature is at most 20° C. or at most 16° C. The glass transition temperature of the foam can be measured by dynamic mechanical analysis using a solids analyzer such as an RSA-G2 Solids Analyzer from TA Instruments. The glass transition temperature is taken at the peak of the tan delta curve. Suitable test conditions using this device are: cylindrical sample dimensions-10 mm thick, 20 mm diameter; compression mode; frequency 1 Hz; strain 0.1%; preload: 15.0 g; heating rate: 3° C./minute.

The flexible polyurethane foam has a recovery time of, for example, at least 0.5 seconds, at least 1 seconds, at least 1.5 seconds, at least 2 seconds, or at least 2.5 seconds, up to 50 seconds, up to 40 seconds, up to 20 seconds or up to 10 seconds. Recovery time is measured by compressing a foam. A test specimen with a size of 4 in×4 in×2 in (10.16 cm×10.16 cm×5.04 cm), with any skin removed, is compressed to 24% of its initial thickness, and held under compression for 60 seconds. The compressive force is then released and the time required for the foam to re-attain 95% of its original thickness is measured as the recovery time. A suitable apparatus for performing recovery time measurements is a RESIMAT 150 Viscoelastic Foam Testing device (Format Messtechnik GmbH, Germany).

Including the tackifier in the foam formulation has been found to increase the recovery time of the foam relative to an otherwise like foam made without the tackifier. Recovery time may be increased, for example, by at least one second or at least two seconds, compared to an otherwise like foam made without the tackifier.

The flexible polyurethane foam may exhibit (after mechanically opening the cells) an airflow of at least 0.24, at least 0.47, at least 0.67, at least 0.95, or at least 1.4 liters/second, measured according to ASTM D-3574. The airflow may be as high as, for example, up to 10, up to 6 or up to 4 liters/second.

The flexible polyurethane foam may meet one or more FR (Flame Resistance) standards, such as British Standard flammability test (BS 5852—ignition source 5) using a wooden assembly (referred to as a crib) as a source of ignition.

It is believed that the increase in recovery time is due to the tackifier forming a continuous or discontinuous tacky layer on the interior surfaces of the foam. In some embodiments, the tackifier forms discontinuous regions or "islands" on internal surfaces of the foam. These islands may have, longest dimensions of, for example, 10 nm to 200 am and may occupy, for example, at least 1%, at least 2.5% or at least 5% up to 75%, up to 50%, up to 40%, up to 33% or up to 25% of the interior surface area of the foam. When the foam is compressed, internal surfaces come into contact; the tackiness imparted by the tackifier causes the contacting internal surfaces to adhere together temporarily until overcome by the elastic recovery of the foam. The temporary adhesion is believed to cause the increase in recovery time.

The presence of tackifier on the internal surfaces of the polyurethane foam can be ascertained using microscopic methods having the appropriate resolution. Scanning electron microscopy is suitable to visualize the regions occupied by the tackifier. Methods such as energy-dispersive X-ray spectroscopy (EDS) are useful to surface assign regions to the tackifier and the foam, respectively, due to chemical differences between the tackifier and foam.

The foam of the invention is useful in cushioning applications such as pillows, mattresses, backrests (for bed headboards, seating, etc.), automotive arm rests, seat cushions for home and/or vehicular seating, packaging, protective cushioning, and the like. It can be used as, or as a component of, sound and/or vibration (i.e., NVH) damping measures. For example, it is useful in acoustic applications to reduce noise, vibration and/or harshness, for earplugs, as well as other applications in which previous slow-recovering polyurethane foams are useful. It is useful in other applications where slow recovery after foam compression is wanted. In general, the slow-recovering foam of the invention can be used in the same applications and in the same manner as conventionally-produced slow-recovering foam.

The following examples are provided to illustrate the invention, but are not intended to limit the scope thereof. All parts and percentages are by weight unless otherwise indicated. All molecular weights are number averages by gel permeation chromatography.

In the following examples:

Polyol A is a 1000 molecular weight, nominally trifunctional polyether polyol. It contains about 0% polymerized ethylene oxide, 91% polymerized propylene oxide and 9% initiator residue.

Polyol B is a 1000 molecular weight, nominally trifunctional random copolymer of 61% ethylene oxide, 30% propylene oxide and 9% initiator residue.

Polyol C is a 3100 molecular weight, nominally trifunctional random copolymer of 11% ethylene oxide and 89% propylene oxide.

The PMDI is a polymeric MDI product having an isocyanate content of 32.8% and an isocyanate functionality of 2.2-2.3.

The Surfactant is a silicone surfactant sold as Niax® L-618 surfactant by Momentive Performance Materials.

The Catalyst is a mixture of bis(2-dimethylaminoethyl) ether, triethylene diamine and stannous octoate.

EXAMPLES 1-4 AND COMPARATIVE SAMPLES A-C

The tackifier used in these experiments is a polyterpene resin sold as Sylvares® TR A25L by Kraton Corporation. This product has a softening temperature of 22-28° C. and a glass transition temperature of −20° C., as reported by its manufacturer. Being a solid, its viscosity at 25° C. is too high to measure. Its viscosity at 50° C. is 4450 cps, as reported by its manufacture. This polyterpene resin is incompatible with the mixture of Polyols A-C described in these examples. It is inert to the polyol mixture, water and polyisocyanate under the conditions of the foaming reaction.

Pre-blends of the tackifier and each of several diluents (5 monols and one polyester polyol) are made by combining the ingredients in a Flecktac high-speed mixer operated at 2500 rpm for 1 minute. In each case, the ratio of tackifier and diluent is varied to produce a pre-blend having a viscosity below 10,000 cps at 25° C. Additional pre-blends are made using ethylene glycol mono-n-hexyl ether at varying concentrations. The amounts of tackifier and diluent and Hansen parameters for the monol diluents as indicated in Table 1.

TABLE 1

| Pre-Blend | Diluent | Hansen Solubility parameters[1] $\delta_d$ | $\delta_p$ | $\delta_h$ | Wt.-% Tackifier | Wt.-% Monol |
|---|---|---|---|---|---|---|
| A | Ethylene glycol mono-n-hexyl ether | 16.0 | 6.9 | 10.9 | 91 | 9 |
| B | Ethylene glycol mono-n-hexyl ether | 16.0 | 6.9 | 10.9 | 78.4 | 21.6 |
| C | Ethylene glycol mono-n-hexyl ether | 16.0 | 6.9 | 10.9 | 20 | 80 |
| D | Dipropylene glycol monophenyl ether | 16.9 | 4.9 | 10.2 | 68 | 32 |
| E | Ethylene glycol monophenyl ether | 17.8 | 5.7 | 14.3 | 60 | 40 |
| F | 175 equivalent weight diethylene glycol/phthalic anhydride polyester diol[1] | — | — | — | 20 | 80 |

[1]$\delta_d$ is Hansen dispersion parameter; $\delta_p$ is Hansen polar parameter; $\delta_h$ is Hansen hydrogen bonding parameter, all values in (J/cc)$^{1/2}$.
[1]This product has a molecular weight of about 350 and a viscosity of about 1750 cps at 25° C.

Flexible polyurethane foams are made using each of Pre-Blends A-F. The foam formulations are as indicated in Table 2. (The amounts of tackifier and monol per 100 parts Polyols A-C are indicated separately at the bottom of Table 2.) All components except catalyst and polyisocyanate are mixed at room temperature for 15 seconds at 2400 rpm using a high-speed pin mixer. The catalyst is then added and mixed for 15 seconds at 2400 rpm, followed by the polyisocyanate addition and mixing for 3 seconds at 3000 rpm. The resulting reaction mixture is poured into a 38 cm×38 cm×24 cm box where it reacts, rises and cures to produce a flexible polyurethane foam. The foams are allowed to cure overnight.

TABLE 2

| Ingredient | A* | 1 | 2 | B* | 3 | 4 | C* |
|---|---|---|---|---|---|---|---|
| Polyol A | 20 | 20 | 20 | 20 | 20 | 20 | 20 |
| Polyol B | 60 | 60 | 60 | 60 | 60 | 60 | 60 |
| Polyol C | 20 | 20 | 20 | 20 | 20 | 20 | 20 |
| Water | 2 | 2 | 2 | 2 | 2 | 2 | 2 |
| Pre-Blend (type, amount) | None | A, 16.48 | B, 19.13 | C, 75 | D, 22.06 | E, 25 | F, 75 |
| Surfactant | 0.8 | 0.8 | 0.8 | 0.8 | 0.8 | 0.8 | 0.8 |
| Catalyst | 0.25 | 0.25 | 0.25 | 0.25 | 0.25 | 0.25 | 0.25 |
| PMDI (index) | 82 | 82 | 82 | 82 | 82 | 82 | 82 |
| Pphp tackifier | 0 | 15 | 15 | 15 | 15 | 15 | 15 |
| Pphp monol | 0 | 1.48 | 4.13 | 60 | 7.06 | 10 | 60 |

*Not an example of the invention.

To measure foam properties, the foam skins are first removed, and the samples are conditioned for 24 hours. Foam density, IFD, compression set, tensile, tear resistance, airflow, and resilience are tested following ASTM standard D3574. Recovery time is measured as described hereinbefore. Results are as indicated in Table 3.

TABLE 3

| Property | Value | | | | | | |
|---|---|---|---|---|---|---|---|
| | A* | 1 | 2 | B* | 3 | 4 | C* |
| Density, pcf (kg/m³) | 3.25 (52.1) | 8.67 (139) | 3.85 (61.7) | Foam Collapsed | 5.64 (90.3) | 6.1 (97.7) | 4.4 (70.5) |
| Recovery time, s | 2.0 | 2.5 | 6.1 | | 5.9 | 40 | >180 |
| Resiliency, % | 3.0 | 2.0 | 2.0 | | 1.0 | 1.4 | 7.4 |
| Air flow, ft³/min (L/s) | 3.3 (1.56) | 8.7 (4.11) | 5.9 (2.78) | | 5.6 (2.64) | 6.1 (2.88) | 4.9 |
| IFD, lbf (N) | | | | | | | |
| 25% | 12.1 (53.8) | 6.7 (29.8) | 5.8 (25.8) | | 6.1 (27.1) | 1.5 (6.7) | 31.1 (138) |
| 65% | 24.3 (108) | 15.4 (68.5) | 12.3 (54.7) | | 13.4 (59.6) | 4.8 (21.4) | 77.4 (344) |
| return 25% | 11.2 (49.8) | 6.1 (27.1) | 5.3 (23.6) | | 5.5 (24.5) | 0.9 (4.0) | 19.2 (85.4) |
| Tear Strength, pli (N/m) | 1.1 (192) | 1.0 (175) | 0.9 (158) | | 0.9 (158) | 0.5 (87) | 6.8 (1190) |
| Tensile Str., psi (kPa) | 8.3 (57.2) | 3.8 (26.2) | 4.2 (29.0) | | 4.2 (29.0) | 1.6 (11.0) | 26.3 (18.1) |
| Elongation, % | 119 | 111 | 142 | | 131 | 182 | 138 |
| 90% Compression Set, % | 11.1 | 1.3 | 1.8 | | 15.5 | 88.4 | 0.6 |

*Not an example of the invention.

Comparative Sample A represents a baseline with no tackifier. Recovery time is 2 seconds. This is increased to 2.5 seconds, 6.1 seconds, 5.9 seconds and 40 seconds, respectively, in Examples 1-4.

Example 4 shows the effect of using a monol that does not have the preferred Hanson solubility parameters. This monol performs less well as a diluent (as shown below), so a large amount of the monol is needed to carry in the same amount of tackifier as in the other examples and samples. The resulting foam is a recovery time of 40 seconds, which is greater than preferred. Additionally, the compression set becomes higher.

Comparative Sample B shows the effect of having too much of the monol. The foam collapses and properties cannot be meaningfully measured.

Comparative Sample C shows the effect of using a low molecular weight polyester diol as a diluent for the tackifier, rather than a monol. The recovery time is >180 seconds and the foam is generally stiff and hard.

Viscosity Reduction Effect of Additional Pre-Blends

Additional pre-blends are made in a manner similar to Pre-blends A-F. In each case the proportion of tackifier is 91.16:9.84. The tackifier is the polyterpene resin used in Pre-Blends A-F. The viscosity of each of the pre-blends is determined using an AR2000 cone-and-plate rheometer from TA Instruments. The cone plate diameter is 25 mm, the shear rate is 10 rad/s and the frequency sweeping is in the range of 0.01 to 100 rad/s. Results are as indicated in Table 4.

TABLE 4

| Monol | Hansen Solubility Parameters[1] | | | Pre-Blend Viscosity, cps |
|---|---|---|---|---|
| | $\delta_d$ | $\delta_p$ | $\delta_h$ | |
| Propylene glycol mono-n-butyl ether | 15.2 | 4.2 | 10.5 | 3300 |
| Dipropylene glycol mono-n-butyl ether | 14.8 | 2.5 | 8.7 | 6500 |
| Tripropylene glycol mono-n-butyl ether | 14.8 | 1.7 | 7.9 | 9300 |
| 2-ethyl hexanol | 15.9 | 3.3 | 11.8 | 11,250 |
| 2,6-Dimethyl-4-heptanol (nonyl alcohol) | 14.9 | 3.1 | 10.8 | 8450 |
| Ethylene glycol mono-n-butyl ether | 16.0 | 7.6 | 12.3 | 4000 |
| Ethylene glycol mono-n-hexyl ether | 16.0 | 6.9 | 10.9 | 4100 |
| Diethylene glycol mono-n-hexyl ether | 16.0 | 6.0 | 10.0 | 7700 |
| Dipropylene glycol monophenyl ether | 16.9 | 4.9 | 10.2 | >20,000 |
| Propylene glycol monophenyl ether | 17.4 | 5.3 | 11.5 | 17,500 |
| 2-Ethyl-1-butanol | 15.8 | 4.3 | 13.5 | 6600 |
| Ethylene glycol monophenyl ether | 17.8 | 5.7 | 14.3 | 125,000 |
| None (neat tackifier) | | | | >300,000 |

[1]$\delta_d$ is Hansen dispersion parameter; $\delta_p$ is Hansen polar parameter; $\delta_h$ is Hansen hydrogen bonding parameter, all values in $(J/cc)^{1/2}$.

The results shown in Table 4 demonstrate the surprising effectiveness of monols having the preferred Hansen Solubility Parameters as described herein. At less than 10% concentration, these reduce the viscosity of the tackifier by twenty-fold or more. When the Hansen parameters of the monol are outside the designated range, as with ethylene glycol monophenyl ether, the monol is much less effective as a viscosity reducer. Much more of the monol is needed to achieve the desired low viscosity in that case; it becomes difficult to incorporate an effective amount of tackifier into the foam formulation without using very large quantities of the monol, as shown in Tables 2 and 3 above.

The monols containing aromatic groups are generally less effective diluents than are those that are entirely aliphatic in nature, and are less preferred.

What is claimed is:

1. A method of making a flexible polyurethane foam, comprising reacting, at an isocyanate index of 60 to 110, a reaction mixture comprising
   A) a polyether polyol having a hydroxyl equivalent weight of no greater than 225 or mixture of two or more such polyether polyols, wherein the polyol or mixture of polyols (i) has a number average hydroxyl functionality of 2 to 4; (ii) includes at least one polyether polyol that has a hydroxyl number of less than 170 and (iii) has an oxyethylene content of at least 10% by weight and/or includes at least one polyether polyol that contains at least 40% by weight oxyethylene units;
   B) 1 to 5 parts by weight water per 100 parts by weight of component A), with
   C) at least one organic polyisocyanate,
   in the presence of
   D) at least one catalyst for the reaction of an isocyanate group with water and/or an alcohol;
   E) at least one foam stabilizing surfactant,
   F) 1 to 45 parts by weight of a tackifier per 100 parts by weight of component A) wherein
      (i) the tackifier has a viscosity of at least 5,000 centipoise at 25° C., and
      (ii) the tackifier has a glass transition temperature of at most 20° C.,
   and
   G) 0.05 to 10 parts by weight per 100 parts by weight of component A) of at least one monoalcohol, the monoalcohol being characterized in having at least 4 carbon atoms, a molecular weight of up to 300 g/mol and a viscosity of up to 500 cps at 25° C. as measured using a cone-and-plate viscometer, provided further that the weight proportion of components F) and G) is at least 20:80 but not greater than 95:5;
   wherein components F) and G) are pre-blended prior to being combined with either of components A) and C) to form a pre-blend having a viscosity of no greater than 20,000 cps at 25° C. as measured using a cone-and-plate viscometer.

2. The method of claim 1, wherein the tackifier includes one or more of a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butane, an epoxy resin, a styrene/conjugated diene copolymer, an ethylene-acrylic acid copolymer, an ethylene-higher alpha-olefin copolymer having a density of less than 0.900 g/cc a silicone oil, a cellulosic, cationic polyacrylamide, para-t-octyl phenol formaldehyde resin, a polyester having a number average molecular weight of 400 to 2000, a urethane acrylate oligomer, and a room temperature liquid ethylene-propylene-diene resin.

3. The method of claim 2, wherein the tackifier includes at least one rosin.

4. The method of claim 2, wherein the tackifier includes at least one polyterpene.

5. The method of claim 2 wherein the amount of tackifier is 5 to 25 parts by weight per 100 parts by weight of component A).

6. The method of claim 2 wherein the amount of tackifier is 7.5 to 20 parts by weight per 100 parts by weight of component A).

7. The method of claim 2 wherein the monoalcohol has at least 5 carbon atoms and a molecular weight of up to 250.

8. The method of claim 2 wherein the monoalcohol has a Hansen Dispersion Parameter of 13.9 to 17.4 $(J/cc)^{1/2}$, a Hansen Polar Parameter of 1.7 to 9.2 $(J/cc)^{1/2}$, a Hansen Hydrogen Bonding Parameter of 3.8-13.9 $(J/cc)^{1/2}$.

9. The method of claim 2 wherein component G) is one or more of 1-pentanol, 2-pentanol, 3-pentanol, 1-hexanol, 2-hexanol, 2-ethyl-1-butanol, 1-heptanol, 2-heptanol, 1-octanol, 2-ethyl-1-hexanol, propylene glycol mono-n-butyl ethyl, dipropylene glycol mono-n-butyl ether, tripropylene glycol mono-n-butyl ether, 2,6-dimethyl-4-heptanol, ethylene glycol mono-n-butyl ether, diethylene glycol mono-n-butyl ether, triethylene glycol n-butyl ether, ethylene glycol mono-n-hexyl ether, diethylene glycol mono-n-hexyl ether, triethylene glycol mono-n-hexyl ether, diethylene glycol monophenyl ether, triethylene glycol monophenyl ether, propylene glycol monophenyl ether, dipropylene glycol monophenyl ether and tripropylene glycol monophenyl ether.

10. The method of claim 9 wherein component G) is selected from one or more of propylene glycol mono-n-butyl ethyl, dipropylene glycol mono-n-butyl ether, tripropylene glycol mono-n-butyl ether, 2,6-dimethyl-4-heptanol, ethylene glycol mono-n-butyl ether, diethylene glycol mono-n-butyl ether, triethylene glycol n-butyl ether, ethylene glycol mono-n-hexyl ether, diethylene glycol mono-n-hexyl ether and triethylene glycol mono-n-hexyl ether.

11. The method of claim 2 wherein the flexible polyurethane foam has a recovery time of at least one second.

12. The method of claim 2 wherein the flexible polyurethane foam has a recovery time of at least two seconds.

13. The method of claim 2 wherein the flexible polyurethane foam exhibits an airflow of at least 1.4 L/s and has a density of 24 to 64 kg/m³.

14. The method of claim 2 wherein the flexible polyurethane foam has a resiliency of at most 30%.

15. A polyurethane foam made in accordance with the method of claim 1.

16. The flexible polyurethane foam of claim 15 wherein the tackifier occupies 2.5 to 40% of the surface area of internal surfaces of the polyurethane foam.

17. The flexible polyurethane foam of claim 16 wherein the tackifier is present on internal surfaces of the polyurethane foam in the form of discontinuous regions having longest dimensions of 10 nm to 200 μm.

* * * * *